(12) United States Patent
Pope et al.

(10) Patent No.: US 6,733,263 B2
(45) Date of Patent: May 11, 2004

(54) COMPOSITION, PROCESS AND APPARATUS

(75) Inventors: Brent K. Pope, Topeka, KS (US); Jerry D. Millican, Topeka, KS (US); Timothy Glen Vande Giessen, Topeka, KS (US)

(73) Assignee: Hills Pet Nutrition Inc., Topeka, WI (US)

( * ) Notice: Subject to any disclaimer, the term of this patent is extended or adjusted under 35 U.S.C. 154(b) by 403 days.

(21) Appl. No.: 09/834,572

(22) Filed: Apr. 13, 2001

(65) Prior Publication Data

US 2002/0192341 A1 Dec. 19, 2002

(51) Int. Cl.7 .................................................. A23P 1/12
(52) U.S. Cl. ............................... 425/131.1; 425/133.1; 426/623; 426/635; 426/805; 426/448; 426/516
(58) Field of Search .......................... 425/133.1, 131.1; 426/623, 635, 805, 448, 516

(56) References Cited

U.S. PATENT DOCUMENTS

| | | | |
|---|---|---|---|
| 3,241,503 A | * 3/1966 | Schaefer | 425/462 |
| 3,480,445 A | * 11/1969 | Slaybaugh | 426/284 |
| 3,916,029 A | * 10/1975 | Hildebolt | 426/94 |
| 3,947,178 A | * 3/1976 | Belshaw et al. | 425/132 |
| 4,006,266 A | 2/1977 | Bone et al. | 426/623 |
| 4,540,585 A | 9/1985 | Priegnitz | 426/28 |
| 4,777,058 A | * 10/1988 | Chandler et al. | 426/448 |
| 4,882,185 A | 11/1989 | Simelunas et al. | 426/283 |
| 4,888,192 A | * 12/1989 | Ramnarine | 426/448 |
| 4,900,572 A | 2/1990 | Repholz et al. | 426/282 |
| 4,997,671 A | * 3/1991 | Spanier | 426/646 |
| 5,417,992 A | 5/1995 | Rizvi et al. | 426/283 |
| 6,117,477 A | * 9/2000 | Paluch | 426/623 |
| 6,143,338 A | 11/2000 | Weinstein et al. | 426/249 |
| 6,254,910 B1 | * 7/2001 | Paluch | 426/282 |
| 6,280,672 B2 | * 8/2001 | Keehn et al. | 264/173.16 |
| 6,312,746 B2 | * 11/2001 | Paluch | 426/282 |
| 6,328,550 B1 | * 12/2001 | Sheen et al. | 425/133.1 |
| 6,517,877 B2 | * 2/2003 | Gannon | 426/94 |

FOREIGN PATENT DOCUMENTS

| | | | |
|---|---|---|---|
| EP | 9647410 | 4/1995 | |
| GB | 2194125 A | 3/1988 | A23L/1/31 |

OTHER PUBLICATIONS

Patent Abstracts of Japan, vol. 010, No. 304 (M–526), Oct. 16, 1986, and JP 61 118224 A (Teito Gomme Seizo KK), Jun. 5, 1986, Abstract.

* cited by examiner

Primary Examiner—N. Bhat
(74) Attorney, Agent, or Firm—Martin B. Barancik

(57) ABSTRACT

A die head suitable for preparation of a dual textured pet food having a core and a shell surrounding or essentially surrounding the core, the die head attached to or an integral part of an extruder, which comprises a) at least two shell flow areas through which an extruded shell composition flows, b) a shell flow control regulator which is capable of impinging upon the shell flow, c) a core inlet tube located post shell flow control regulator, its orifice in the shell flow, and delivering core composition to the shell flow wherein the shell composition essentially or totally envelops the core composition d) the shell enveloped core composition exiting the die orifice.

7 Claims, 5 Drawing Sheets

COMPOSITION, PROCESS AND APPARATUS

BACKGROUND OF THE INVENTION

Dual textured pet foods have been known in the art for many years. U.S. Pat. No. 6,117,477 issued Sep. 12, 2000 discloses a dual textured food with a hard shell and a creamy filling wherein among other requirements, the shell contains less than 25% moisture. Within the disclosure of the '477 patent, particularly at column 1, line 20 to column 2, line 42 are disclosed numerous patents relating to dual textured pet foods.

The problem of preparing a dual textured material which has all a pet's daily nutrients in a form which is shelf stable, palatable and visually appealing is an ongoing issue. Such a composition has the capability of functioning as a delivery system for various functional, nutritional, and/or pharmaceutical ingredients.

A new process has now been discovered which can prepare a dual textured pet food having total nutritional value, if desired. The process features the preparation of the filling mixture in a heating vessel and the preparation of the hard shell in an extruder, the combining of the extruded shell and the filling in a die head which brings about the total enveloping of the filling with the shell and the exiting of the die head as a rope with the shell surrounding the filling followed by a severing of the rope into specific pieces of a desirable shape, for example, trapezoids, or pillow shapes.

Pet foods must contain all of a pet's daily nutrients. The challenge in preparing a dual textured material is to assure it is shelf stable, palatable, visually appealing, and provides the minimum nutritional requirements without excess nutrients or ingredients that could be harmful. This is preferably accomplished by a unique die head which allows the extruded product to come off the die in a linear fashion. The shell flow module contains an individual shell flow regulator mechanism for each die hole which controls the pressure and, therefore, the flow of the shell material to be balanced to the individual die and from die to die as well. This assists in maintaining the desired nutritional profile of the diet. The shell filling module of the die is comprised of individual and separate nozzle like assemblies for each die opening. The individual nozzle openings are comprised of the nozzle body, die, core filling inlet connection and core outlet, any or all of which are configured to bring about specific advantages. The shell envelops the core as it exits the core outlet and form ropes. Additionally, the core outlet orifice is of such a projection into or even with the die taper of the die orifice and the core outlet orifice is of such a cross section that working together these two parameters provide a velocity of the shell composition exiting the die orifice which is closely matched to the velocity of the enveloped core composition. As the ropes exit the die opening, they are laid down on an upwardly inclined conveyor which advantageously prevents crossover, particularly when the die opening has affixed thereto conduits i.e., guide chambers which the ropes enter and which contain the ropes while they cool (set) and seem to lose to at least a significant extent their shear energy, thereby reducing the chance of rope crossover on the conveyor. The inclined conveyor further provides setting time prior to feeding the crimper/cutter. These and further advantages and aspects of the die will be elaborated upon later in the specification.

Other advantageous aspects of the invention are the nature of the filling as to physical appearance and chemical composition.

SUMMARY OF THE INVENTION

In accordance with the invention, there is a die head suitable for preparation of a dual textured pet food having a core and a shell surrounding or essentially surrounding the core, the die head attached to or an integral part of an extruder, which comprises
  a) at least two shell flow areas through which an extruded shell composition flows,
  b) a shell flow control regulator which is capable of impinging upon the shell flow,
  c) a core inlet tube located post shell flow control regulator, its orifice in the shell flow, and delivering core composition to the shell flow wherein the shell composition essentially or totally envelops the core composition, and
  d) the shell enveloped core composition exiting the die orifice.

A further aspect of the invention is a die head suitable for preparation of a dual textured pet food having a core and a shell surrounding or essentially surrounding the core, the die attached to or an integral part of an extruder which comprises:
  a) at least two shell flow areas through which an extruded shell composition flows.
  b) a core inlet tube, its orifice in the shell flow, the orifice of such a cross sectional size and located a distance from the die opening such that the velocity of the shell composition exiting the die opening is closely matched to the velocity of the core composition.

A still further aspect of the invention is a dual textured pet food wherein a shell completely or essentially envelops a core which comprises preparing a core composition in a vessel capable of being heated to at least about 140° F., transferring core composition to a core inlet tube of a die head, preparing a shell composition of at least about 30 wt. % grains and mixing in a mixer, transporting to an extruder wherein the shell composition is subject to radial mixing, passing the core composition into a die head wherein the shell envelops or essentially envelops the core and exits the die head as a shell enveloped core.

The set back of the filling tube from the opening of the die is such as to allow flow of the shell material around the filling tube. This set back is approximately two times the diameter of the die opening but can vary from about 1.7 to about 2.3 times the diameter of the die opening. It should not be set back further than the end of the die taper.

DETAILED DESCRIPTION OF THE INVENTION

Figure 1:
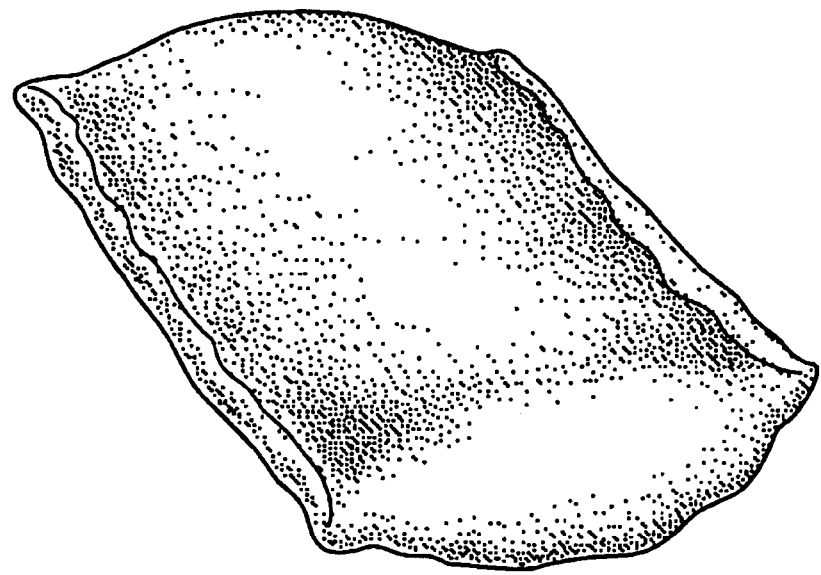
FIG. 1 is a perspective view of a pet food product of the present invention.

The invention provides a shelf stable dual textured pet food product containing a softer filling and a harder shell enveloping the filling. The product has significant advantages both with respect to aesthetics and palatability as well as other attributes such as ease, continuity and consistency of product through use of preferred processing.

The overall process is simple and utilizes only one extruder. Rather than mixing the filling in a separate extruder and attempting to coordinate the preparation of a dual textured product through two separate extrudates, the filling is prepared in a vessel capable of being heated to a temperature of at least 140° F. and then pumped, desirably, into a further mixer and metered into a die head. In approximately the same time frame, the shell components are mixed together, added, desirably, to a preconditioner which is then fed to an extruder wherein the extrudate moves into the die head. The extrudate envelopes the filling material and is conveyed to a crimping and cutting system wherein the desired shape is prepared. This can be exemplified by the cylindrical, angular, or "pillow" shape. The pillow shape is preferable.

With respect to the particular filling employed, real meat is employed so as to provide good palatability to the product. Since meat generally has a water content of greater than 50%, excess moisture from the meat can be emulsified within the filling to keep it homogeneous. Since the filling generally has a moisture content greater than 10% and water activity greater than 0.6%, a chemical preservation system is usually necessary to keep it stable and prevent it from molding.

When taking into account the need for a balanced complete nutritional profile to be supplied in the diet, the canine product is generally about 14 to about 26 wt. % protein, about 8 to about 16 wt. % fat and less than about 5 wt. % ash. For felines, the quantities are about 20 to about 34 wt. % protein, about 14 to about 26 wt. % fat and less than about 5% ash. The filling generally makes up about 25 to about 40 wt. % of the product, the feline product primarily at the lower end of the range and the canine product primarily at the upper end of the range. As stated before the preferred product is a kibble which is preferably "pillow" shaped.

With respect to the core composition, after mixing humectants, the fat, and meat for filling in a high shear mixer, such as a Breddo® mixer, the viscosity of the slurry is increased by adding meat by-product meal, such as poultry, until the desired consistency is achieved. The use of grains or starches, as is commonplace does not provide a workable viscosity when heat treating the meat and fats due to gelatinization of starches. The filling mass is transferred from the Breddo mixer through a transfer pump to a holding mixer, such as a Hobart® mixer grinder, that also serves as a stuffing pump. The core composition is then metered to the die through a positive displacement pump, such as a Moyno® progressive cavity pump. Flow is controlled by devices such as a Micro-Motion® control, or loss in weight measurement system. In the die, the filling is enveloped by the extruded shell material and further treated as aforementioned until a dual textured pet food is prepared.

The shell is generally comprised of the following components: Grain(s), meat by-product, vegetable protein such as corn gluten meal or soybean meal, vitamins, minerals, and antimycotics. These are generally brought together into a mixer, further ground in a hammermill, passed to an Acrison® loss in weight feeder, then transferred continuously to a preconditioner where mixing with steam and water occurs. The heated grain mixture is then fed into the extruder where extrusion with a screw occurs after cooking at about 210 to 250° F. It is then extruded into a die head where it envelops the core component.

In general, the difference between a canine and a feline diet is that feline diets are higher in fat and/or protein content than canine diets.

This is usually demonstrated by the increased level of protein and/or decreased level of grains in the overall diet.

The preferable die head is a linear set up in which the shell composition flows around the tubes carrying the core and exits the individual dies as filled "ropes", the shell surrounding the core. The extrusion rate of the shell is from about 5 to about 25 lbs/minute per die hole, generally about 6 to about 16 lbs/minute per die hole.

The die assembly is generally of modular design comprised of a base, shell flow control module, and shell-filling module. If done in a single block design, the functions remain the same. The base can contain a flange that is either bolted or clamped to the end of the extruder and a circular to rectangular transition. This round to rectangular transition allows the extruded product to come off the die in a linear fashion, which helps prevent entangling of the "ropes" as they exit the die. Within the circular to rectangular transition are individual shell flow areas. These shell flow areas direct the shell portion of the diet into the shell flow control module.

The shell flow control module contains an individual throttling control valve or other control mechanism for each die hole. The throttling valves are particularly valuable due to the uneven radial pressures that are generated by the spinning extruder screw. This uneven pressure profile results in varying flow to each of the die holes. If left unchecked, the varying flow of the shell would prevent control of the shell to filling ratio at each die opening. Shell to core ratio control is necessary to maintain the desired nutritional profile of the diet. Control of the rate of flow is also critical to maintaining uniform piece size and desirable aesthetics of the pillow shaped kibble. The throttling control valves built into each shell flow area allow the pressure and therefore the flow of the shell material to be balanced and evened out to the individual die openings. The throttling valves allow complete shut off as well as fully opening of the flow area and various settings between full open and closed.

An example of such a control mechanism is a threaded screw capable of adjustment to the desired depth of the shell flow. Such impinging element should be perpendicular or essentially perpendicular to the shell flow for greater effect. Although smaller angles to the shell flow can be employed, an angle of at least about 45° can be employed. Preferably, an angle of at least about 75° to shell flow should be employed with the maximum angle being 90°, that is perpendicular to shell flow.

After the shell flow control module is the shell-filling module. The shell-filling module can be comprised of individual and separate nozzle-like shell filling assemblies for each die opening. The shell filling assembly has an inlet in which the core is brought into the die head and exits the core filling orifice, the orifice being of a certain cross sectional size and distance away from the die opening so that the velocity of the shell exiting the die opening is closely matched to the velocity of the core inside the shell exiting the die opening.

The core inlet can be threaded such that the filling pump can be advantageously connected directly to the filling tube. The filling tube can be brought into the center of the die head so that the core flow is oriented parallel or essentially parallel to the direction of the shell material flow. Consequently, the shell material flows around the filling tube and at least essentially parallel to the core flow. Filling flow rates can be about 1–15 lb./min. per die hole generally about 3 to about 10 lb/min. per die hole depending upon the desired shell to filling ratio. As the filling is pumped into the filling tube at the desired rate and the shell material flows around the filling tube, a filled "rope" is formed as the core leaves the core filling tube outlet. The filled rope then enters the remainder of the die. The set back of the filler tube orifice from the die opening is important in maintaining uniform linear velocities of both the filling stream and shell material as they exit the die. If the filling tube orifice is too close to the die opening, it throttles the flow of the shell. The shell material's linear velocity is increased due to additional back pressure in the extruder and shell material is extruded faster than the filling material. This creates a shell that is too thin and cannot hold the filling without leaking. If the filling tube is set back too far from the die opening, shell flow creates excessive back pressure on the filling pump and can interrupt the flow of the filling.

The die opening (outer area) has three major design features: Die taper, die land and die diameter. Die taper is normally measured in degrees and describes the gradual constriction of the flow area from the inlet of the die to the die land inlet. The die land describes the length of the flow area following the taper that is straight and parallel to the product flow. The die diameter is the diameter of the cross-sectional flow area within the land length. For the dual textured product nominal die taper is about 15–45° with a land length essentially equal to die diameter which can vary depending upon the desired size of the product.

As the filled product exits the die, the shell portion of the diet expands outwardly and inwardly providing a superior "filled" look compared to similar products. The adjustment of the set back also allows some control in the shell expansion. The product exits the die head in the form of evenly spaced filled ropes. The number of ropes is equal to the number of die holes. The ropes are laid down on an inclined belt conveyor, which further helps to control the ropes preventing crossover and allowing time for the shell to "set." The ropes then feed the crimper/cutter.

Optionally and desirable is the inclusion of a guide chamber on the outlet of each die opening. These tubes are larger in diameter than the extruded ropes and serve the purpose of controlling the tendency of the ropes to curl upon exiting the die opening. Generally, the length of the guide chamber is about 8 to about 30 times the die opening and the inner diameter of the guide chamber is about 1.5 to about 6 times the die opening. Preferably, the length of the guide chamber is about 10 to 24 times the die opening and the guide chamber inner diameter is about 2 to 4 times the die opening, with respectively about 12 times and about 3 times the most preferable.

It is thought that the radial energy imparted from the extruder screw is further dissipated within the guide chamber. The shell portion expands somewhat in the guide chamber and the product begins to set as well.

The shell is harder and more homogeneous in look and texture than the filling. The shell is composed primarily of grains, generally greater than about 65 wt. % of the shell composition. Other components therein are about 15 to about 25 wt. % of vegetable protein and about 5 to about 10 wt. % of poultry by-product meal.

The filling can be any type of consistency but is preferably highly textured and is not creamy in appearance and feel. It is essentially coarse and particulate in nature but with sufficient viscous material to provide good flow and fill, or essentially fill, the shell so there is very little space if any between the shell and the filling. The filling is primarily fat, humectants, and meat such as poultry by-product meal. The ratios of components differ for canine and feline dependent upon their dietary requirements. Interestingly, there are less humectants in feline diet due to the higher fat content that tends to lower the filling viscosity without a corresponding reduction in the humectant amount.

Further description of the invention will now be made with respect to the Figures.

FIG. 1 is a view of the preferred shape of the core shell feed. It is essentially pillow shaped and only shows the shell.

Figure 2:
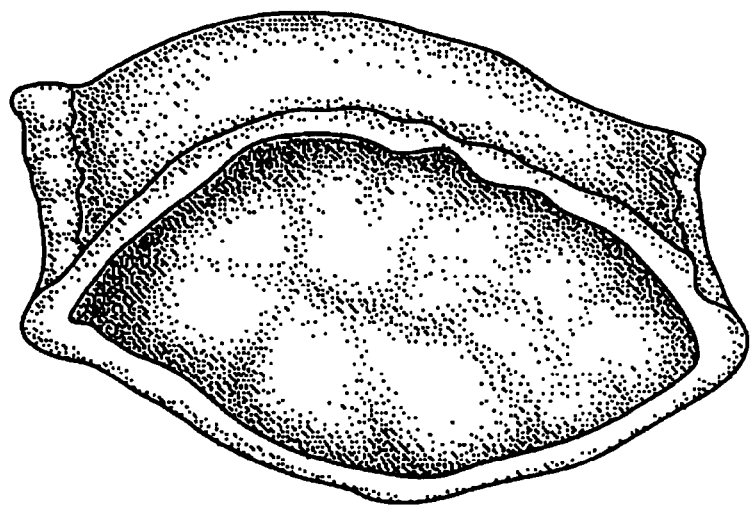
FIG. 2 is a perspective view of a pet food kibble of the present invention cut vertical showing a vertical cross section of the shell and the core.

FIG. 2 is a view of the core shell particle split open. This shows the core filling in its coarse, particulate nature and abutting against the inner surface of the shell. There is very little visible infiltration of the shell by the filling component.

Figure 3:
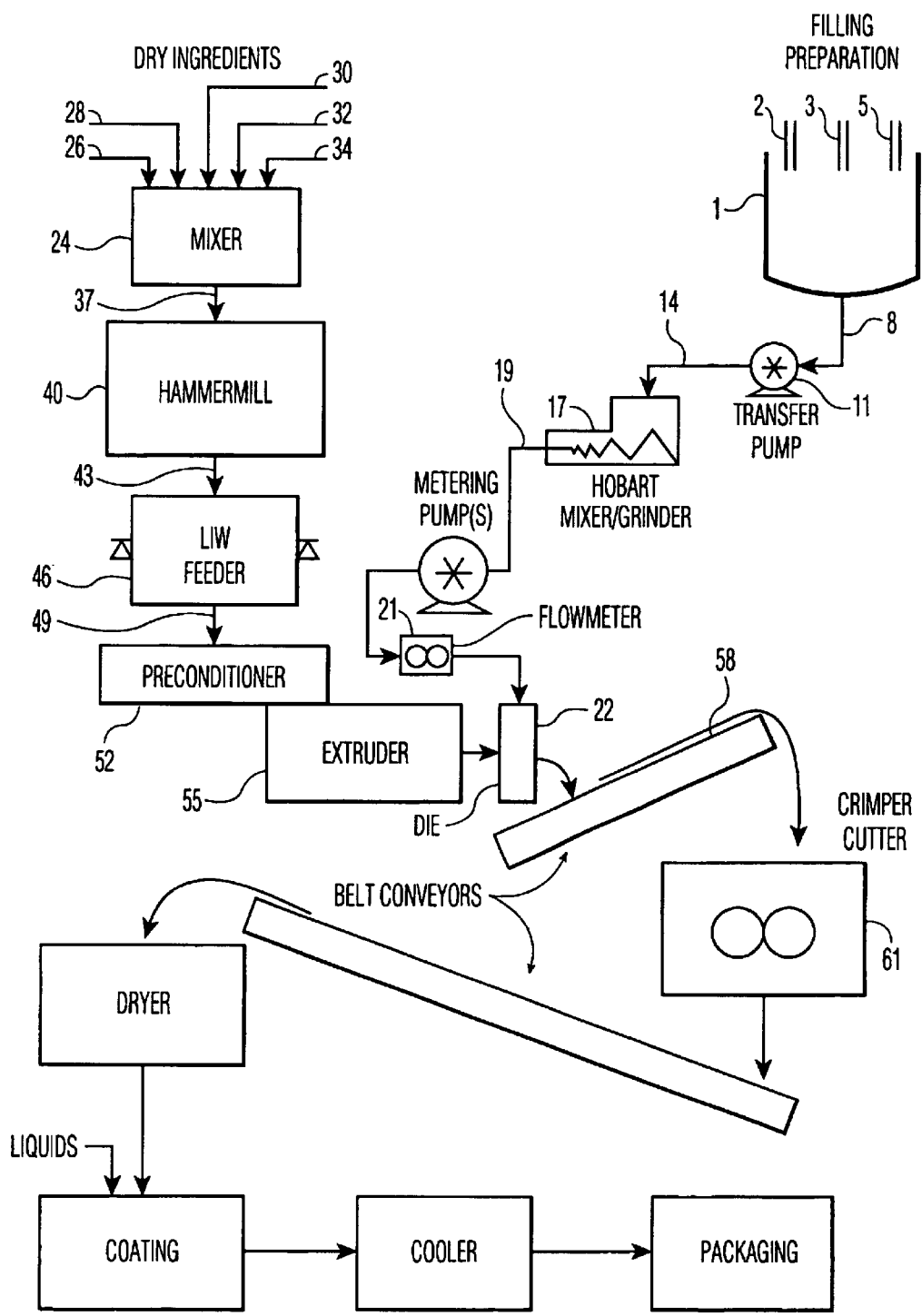
FIG. 3 is a flow chart of the overall process in preparing a pet food of the invention.

FIG. 3 is a graphic depiction of the process used to prepare the core shell dual textured pet food of this invention. Into a heated vessel such as a Breddo mixer, 1, various of the core components are fed such as dry components like poultry by-product meal, vegetable protein and emulsifiers through line 2, meat components such as chicken, beef or veal through line 3 and liquid components such as high fructose corn syrup, glycerine and fat through line 5. These are heated in 1 to a temperature of about 175° F. or higher under shear. After holding an appropriate temperature to achieve proper mixture and cooking of meats and/or meat byproducts, the total composition leaves 1 through line 8, passes through a transfer pump, 11, through line 14 to a Hobart mixer/grinder or other type of mixer/grinder 17, to adjust particle size to desired quantity, exits through line 19 and is metered, 21, into die, 22. The shell ingredients are fed into a mixer, 24 through various lines 26, 28, 30, 32 and 34 where they are combined and fed through line 37 into a hammermill, 40, where the dry materials are ground to the desired size and mixed through line 43, into a lost in weight feeder, 46, and through line 49 to an extruder preconditioner, 52, which is feeds an extruder, 55. In the extruder, the shell components are further heated, and mixed through the screw apparatus and enter into the die, 22 wherein the shell composition surrounds the filling composition fed into the die, 22, and exits the die as a core shell "rope" which falls onto an upwardly tilted conveyor belt, 58, which brings the rope to a crimper/cutter, 61 wherein the rope is crimped and cut into kibbles preferably pillow shaped. The kibble then goes through various normal operations such as drying, coating, if desired, cooling and then packaging.

Various perspectives of the prepared die head are shown in FIGS. 4, 5, 6 and 7.

Figure 4:
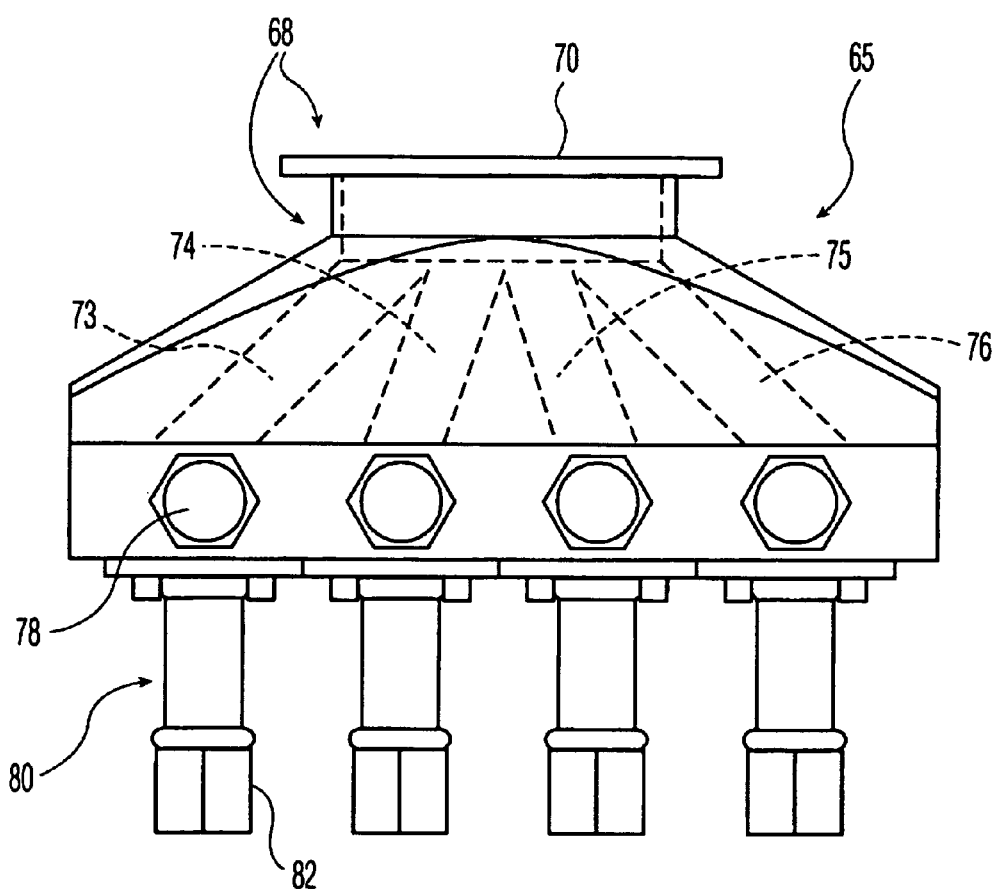
FIG. 4 is an overhead view of the preferred die head of the invention.

FIG. 4 shows an overhead perspective of the die, 65. The base of the die, 68, has a flange, 70, generally circular which is connected to the exit opening of the extruder. Alternatively, the extruder can be "one-piece" with the die molded with the construction of the extruder. Lines 73, 74, 75, and 76 shows the shell flow areas within the die. Line 78 shows the shell flow control valve and the shell filling modules, 80. The die caps, 82 are at the outlet of the shell filling modules 80. The die has four areas for delivering the shell and shell enveloped core. However, any number of areas, outlets, can be employed.

Figure 5:
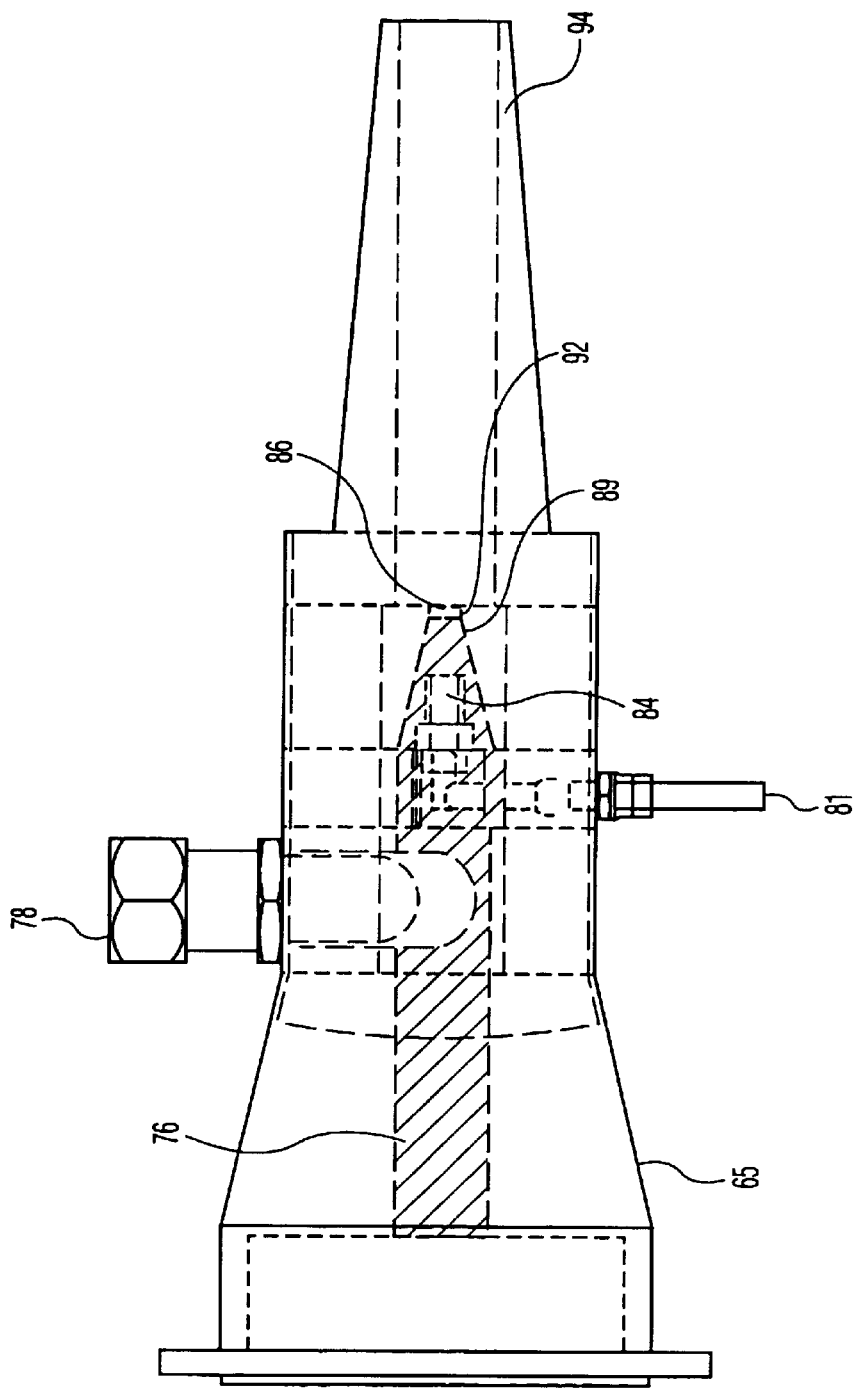
FIG. 5 is a lateral view of an individual die of the invention preferred die head and the optional guide chamber.

FIG. 5 shows a lateral view of the die, 65, a single shell control valve, 78, a shell flow area, 76, the core filling inlet, 81, the core outlet, 84, the die opening, 86, die taper, 89, the die land, 92 and the optional guide chamber, 94.

The core filling inlet, 81, is positioned after the shell control valve, 78. This provides complete enveloping of the core with the shell inside the die head, 65, and helps provide the necessary control of each rope for a consistent diet composition.

Figure 6:
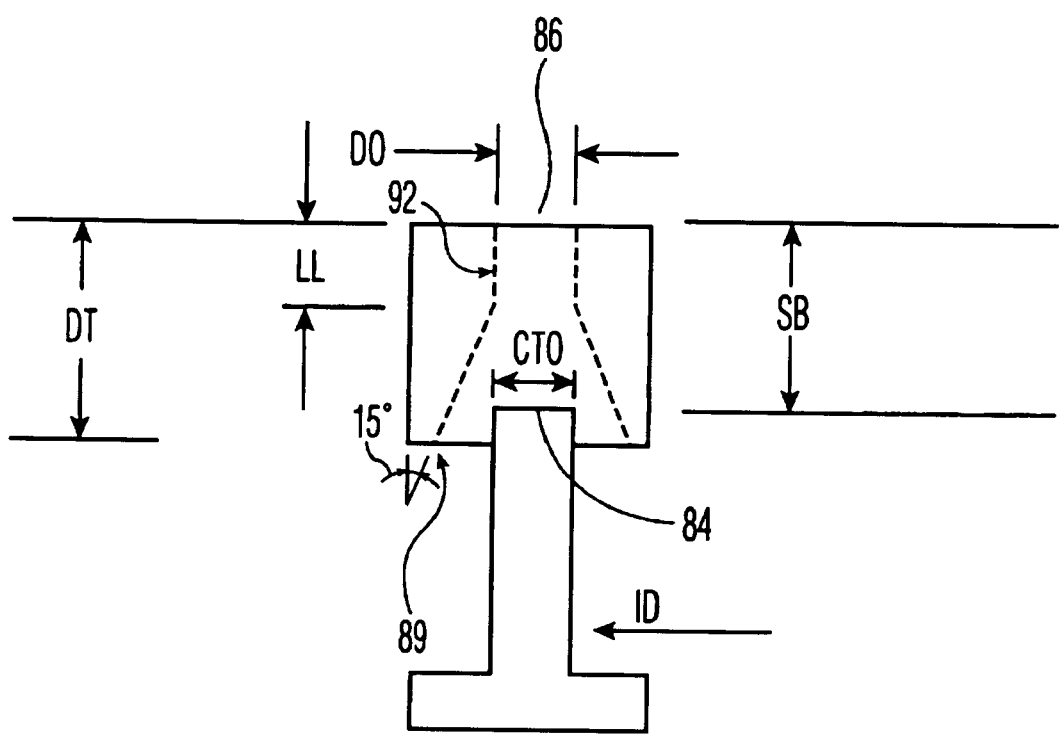
FIG. 6 is an overhead view of a portion of the preferred die head of the invention with accent on the core tube outlet, die taper, die orifice and die land.

FIG. 6 shows a schematic of the core tube, and orifice, 84, in juxtaposition with the die opening, 86 with reference to the die taper, 89, and die land, 92.

A specific set of measurements showing juxtaposition of core outlet tube, die taper, die land, and set back position is the following. The letters in parenthesis refer to FIG. 6.

Die taper 15°
Die land length 0.2 inch (LL)
Core tube orifice internal diameter 0.24 inch (CTO)
Die opening 0.33 inch (DO)
Die thickness 0.75 inch (DT)
Set back (core tube orifice to die opening) 0.63 inch (SB)

The core tube orifice is preferably within the die taper. The set back of the filling tube from the opening of the die is such as to allow flow of the shell material around the filling tube and is set back approximately two times the inner diameter of the die opening. It should not be set back further than the end of the die taper.

Below are examples of the concept of the invention. In all examples, a four hole die is used.

CANINE EXAMPLE —1

| Shell Formula | |
|---|---|
| Component | Wt. % |
| Corn | 65 |
| Soybean Meal | 18 |
| Poultry Meal | 6 |
| Sugar | 4 |
| Corn Gluten Meal | 3 |
| Dhy. Egg | 1 |
| Minerals | 1.3 |
| Flaxseed | 1 |
| Anti-mycotics | 0.5 |
| Vitamins | 0.1 |
| Antioxidants | 0.1 |
| TOTAL | 100 |

Add the above ingredients in a mixer and blend for 5 minutes. Feed into hammer mill with 4/64" screen size to reduce particle size. Load into loss in weight feeder above the preconditioner.

| Filling Formula | |
|---|---|
| Component | Wt. % |
| Poultry Meal | 29 |
| Vegetable Oil | 21 |
| Chicken | 17 |
| Glycerine | 14 |
| Corn Syrup | 10 |
| Wheat Gluten | 7 |
| Minerals | 1.4 |
| Anti-mycotics | 0.5 |
| Antioxidants | 0.1 |
| TOTAL | 100 |

Add corn syrup, glycerine and vegetable oil to high shear mixer (Breddo). Heat to 140° F. Add remainder to ingredients and heat to 180° F. Add 15% water and 9% steam to grain mixture in the preconditioner. When grain reaches 180° F., feed mixture at 28 pounds per minutes into extruder. Start filling pump and meter at 12 pounds per minute into the die head. A dual textured pet food rope is prepared with 70 wt. % shell and 30 wt. % core composition.

Start transfer belt conveyor and adjust to same linear velocity as extrudate is exiting extruder die. Pull extrudate ropes through crimper cutter to form pillow shape. Convey wet pillows to dryer. Dry through continuous dryer at 270° F. for 45 minutes. Transfer dried pillows to enrober and spray with 2% liver digest by weight. Cool to ambient temperature and package.

FELINE EXAMPLE—2

| Shell Formula | |
|---|---|
| Component | Wt. % |
| Rice | 31 |
| Corn | 22 |
| Corn Gluten Meal | 22 |
| Poultry Meal | 21 |
| Minerals | 1.3 |
| Dhy. Egg | 1 |
| Flaxseed | 1 |
| Anti-mycotics | 0.5 |
| Vitamins | 0.1 |
| Antioxidants | 0.1 |
| Sugar | 0 |
| TOTAL | 100 |

Add the above ingredients in a mixer and blend for 5 minutes. Feed into hammer mill with 4/64" screen size to reduce particle size. Load into loss in weight feeder above extruder.

| Filling Formula | |
|---|---|
| Component | Wt. % |
| Vegetable Oil | 36 |
| Rice Gluten | 8 |
| Poultry Meal | 24 |
| Minerals | 1 |
| Glycerine | 8 |
| Dextrose | 4 |
| Chicken | 18 |
| Antioxidants | 0.1 |
| Anti-mycotics | 0.5 |
| TOTAL | 100 |

Add glycerine and vegetable oil to high shear mixer (Breddo). Heat to 140° F. Add chicken and return to 140° F. Add remainder of ingredients and heat to 180° F. Transfer to Hobart mixer/grinder.

Start pre-conditioner of extruder. Heat to 180° F. Feed heated grain mix at 28 pounds per minute into extruder. Start filling pump and meter at 12 pounds per minute into the die head. A dual textured pet food with 70 wt. % shell and 30 wt. % core is prepared.

Start transfer belt conveyor and adjust to same linear velocity as extrudate is exiting extruder die. Pull extrudate ropes through crimper cutter to form pillow shape. Convey wet pillows to dryer. Dry through continuous dryer at 270° F. for 45 minutes. Transfer dried pillows to enrober and spray with 2% liver digest by weight. Cool to ambient temperature and package.

What is claimed is:

1. A die head suitable for preparation of a dual textured pet food having a core and a shell surrounding or essentially surrounding the core, the die head attached to or an integral part of an extruder, which comprises
   a) at least two shell flow areas through which an extruded shell composition flows,
   b) a shell flow control regulator which is capable of impinging upon the shell flow,
   c) a core inlet tube located post shell flow control regulator, its orifice in the shell flow, and delivering core composition to the shell flow wherein the shell composition essentially or totally envelops the core composition
   d) the shell enveloped core composition exiting the die orifice.

2. The die head of claim 1 wherein the shell flow control regulator is located at an angle of about 75 to 90° to the shell flow.

3. The die head of claim 1 wherein the shell control regulator through its ability to impinge upon the shell flow controls the pressure of the shell flow so as to at least essentially balance the shell flow of one individual shell flow area to another shell flow area.

4. The die head of claim 1 wherein post shell core composition die orifice and attached or integral thereto and of a cross section larger than the cross section of the orifice is a guide chamber of such a length and a cross section that the shell core composition flowing through said orifice is capable of expansion, thereby inhibiting crossover of the shell core composition after leaving the guide chamber.

5. The die head of claim 1 wherein the core inlet tube orifice is of such a cross sectional size and located a distance from the die orifice such that the velocity of the shell composition exiting the die opening is closely matched to the velocity of the core composition exiting the core outlet or die orifice.

6. A die head suitable for preparation of a dual textured pet food having a core and a shell surrounding or essentially surrounding the core, the die attached to or an integral part of an extruder which comprises:
   a) at least two shell flow areas through which an extruded shell composition flows.
   b) a core inlet tube, its orifice in the shell flow, the orifice of such a cross sectional size and located a distance from the die opening such that the velocity of the shell composition exiting the die opening is closely matched to the velocity of the core composition.

7. A method of preparing a dual textured pet food wherein a shell completely or essentially envelops a core which comprises preparing a core composition in a vessel capable of being heated to at least about 140° F., transferring core composition to a core inlet tube of the die head of claim 1, preparing a shell composition of at least about 30 wt. % grains and mixing in a mixer, transporting to an extruder wherein the shell composition is subject to radial mixing, passing the core composition into a die head of claim 1 wherein the shell envelops or essentially envelops the core and exits the die head as a shell enveloped core.

* * * * *